Figures 1, 2:
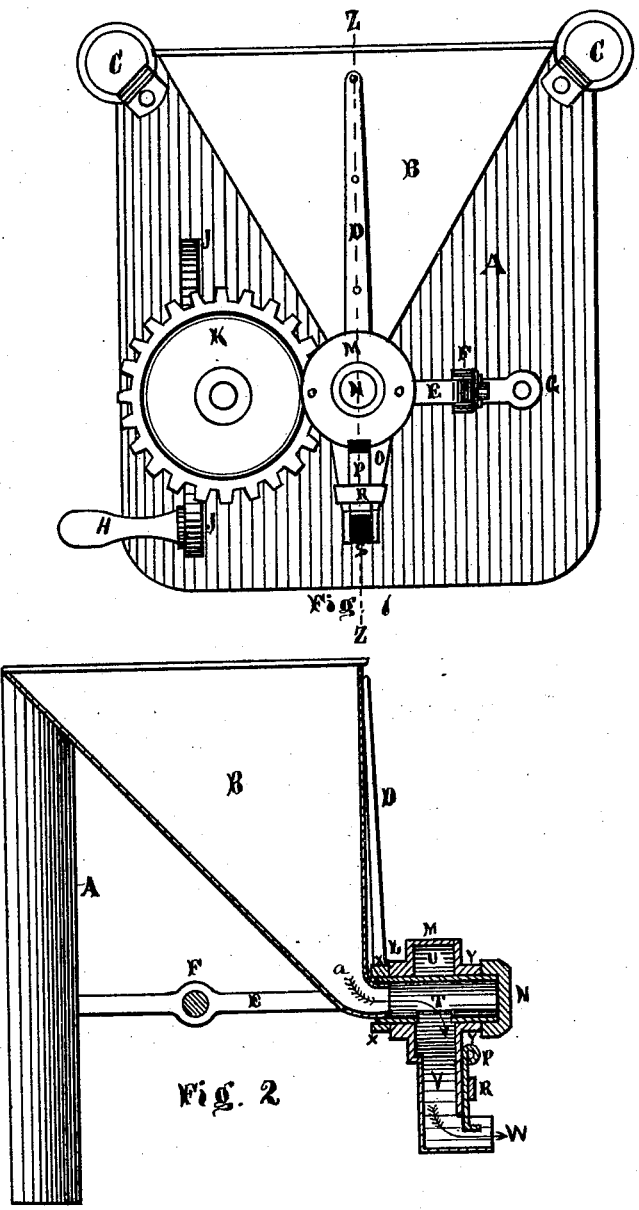

R. FURNAS.
Broad-Cast Seed-Sower.

No. 164,159.

Patented June 8, 1875.

Witnesses:

Inventor.
Robert Furnas

UNITED STATES PATENT OFFICE.

ROBERT FURNAS, OF DECATUR TOWNSHIP, MARION COUNTY, INDIANA.

IMPROVEMENT IN BROADCAST SEED-SOWERS.

Specification forming part of Letters Patent No. 164,159, dated June 8, 1875; application filed March 11, 1875.

*To all whom it may concern:*

Be it known that I, ROBERT FURNAS, of Decatur township, county of Marion and State of Indiana, have invented an Improvement in Broadcast Seed-Sowers, of which the following is a specification:

The object of my invention is to construct a head and feed spout, and to revolve the same upon a hollow shaft, which is provided with an opening at the bottom, in such a manner that as the head revolves the seed will be distributed broadcast equally.

Figure 1 represents a front elevation of the machine embodying my improvement. Fig. 2 is a sectional view of the same through the line $z\ z$ of Fig. 1.

A represents a breast-plate, made of sheet-iron or other suitable material, to which is secured the frame E, also the seed-trough B. At the front and lower part of the seed-trough, the frame has a hole, in which the tapered end of the trough enters from the rear, and a hollow shaft, I, is screwed into the front part. The bottom of the hollow shaft has a hole cut therein, for the purpose of allowing the seed to pass out into the hollow revolving head M. This head has a small spur-gear, L, attached to the side next to the frame, which also forms one of the bearings on the hollow shaft I.

At the outer edge of the hollow head M is a flange, Y, that also forms a bearing on the shaft I, thus leaving a hollow annular space, U, around the shaft I. At the bottom of the revolving head M is attached a spout, V, the lower end of which is turned at right angles from the main part of the spout, and is provided with a gate, P, which is held in front of the spout by the guide R, in such a manner that the flow of seed can be regulated with great accuracy. The whole revolving head and spout are secured on the hollow shaft I by the cap N, which is screwed thereon.

The operation of my improved machine is as follows: The trough B is filled with seed, and the gate P opened to regulate the desired flow of seed. By revolving the gear J it communicates its motion to a small gear immediately behind the wheel K, and the wheel K communicates with the wheel L, which is attached to the hollow head M, causing it to revolve very rapidly, and the centrifugal motion causes the seed to be scattered broadcast as it leaves the spout V.

I do not broadly claim the revolving arms, the seed-trough B, nor the mode of producing the centrifugal motion to the head, as they are old.

What I claim as new, and wish to secure by Letters Patent, is—

The hollow revolving head M, constructed with gear L cast onto the rear side, and forming, with the flange Y at the front side, bearings for the head to revolve upon, in combination with the hollow shaft T, provided with an opening in the bottom, to allow the seed to enter the revolving head, and the cap N, all constructed and arranged substantially as specified.

In testimony whereof I have signed my name to this specification in the presence of two subscribing witnesses.

ROBERT FURNAS.

Witnesses:
   IRA C. WEBB,
   JOHN W. COONS.